United States Patent [19]

Schlumpf et al.

[11] Patent Number: 5,017,015
[45] Date of Patent: May 21, 1991

[54] DIRECT PROCESSING OF POLYMER WITH PULVERULENT ADDITIVES IN INJECTION MOULDING MACHINES

[75] Inventors: Hans-Peter Schlumpf, Oftringen; Hans J. Pfister, Zofingen; Edwin Oshsner, Vordemwald, all of Switzerland

[73] Assignee: Plüss-Staufer AG, Switzerland

[21] Appl. No.: 361,223

[22] Filed: Jun. 5, 1989

Related U.S. Application Data

[63] Continuation-in-part of Ser. No. 122,205, Nov. 18, 1987, abandoned.

[30] Foreign Application Priority Data

Jan. 27, 1987 [DE] Fed. Rep. of Germany ....... 3702348

[51] Int. Cl.$^5$ ................................................ B29B 7/42
[52] U.S. Cl. .......................................... 366/82; 366/89
[58] Field of Search ................. 366/78, 79, 81, 82, 366/89, 90, 76, 85, 88, 83, 84, 319, 318, 322, 323; 425/203, 207, 208, 209

[56] References Cited

U.S. PATENT DOCUMENTS

| | | | |
|---|---|---|---|
| 2,753,595 | 7/1956 | Dulmage | 366/79 X |
| 3,195,868 | 7/1965 | Loomans et al. | 366/85 |
| 3,690,623 | 9/1972 | Boyne | 366/90 X |
| 3,787,542 | 1/1974 | Gallagher et al. | 425/208 X |
| 4,015,833 | 4/1977 | Kim | 366/82 |
| 4,074,362 | 2/1978 | Kruder et al. | 366/87 X |
| 4,474,473 | 10/1984 | Higuchi et al. | 366/85 X |
| 4,534,652 | 8/1985 | Stade | 366/85 |
| 4,616,989 | 10/1986 | Mewes et al. | 425/208 X |
| 4,652,138 | 3/1987 | Inoue et al. | 366/89 |
| 4,663,103 | 5/1987 | McCullough et al. | 366/88 X |
| 4,729,666 | 3/1988 | Takubo | 366/89 X |
| 4,752,135 | 6/1988 | Loomans | 366/82 X |

OTHER PUBLICATIONS

Spirex, "Screw and Barrel Technology", 1985 (month unknown).

Primary Examiner—Harvey C. Hornsby
Assistant Examiner—Scott J. Haugland

[57] ABSTRACT

In a method for processing granulate and/or pulverulent polymer with pulverulent additives in an injection moulding machine having a screw with a feed zone of constant screw core diameter, and intermediate zone with a compression and metering section and a mixing element array, with regard to particularly economic processing to high quality injection mouldings the polymer and the pulverulent additives are introduced without previous preparation directly into the feed zone of the screw and in the feed zone the polymer is thoroughly mixed with the pulverulent additives at least twice by means of mixing element arrays, the working length of the screw for the processing having at least 19 times the screw diameter.

6 Claims, 4 Drawing Sheets

DIRECT PROCESSING OF POLYMER WITH PULVERULENT ADDITIVES IN INJECTION MOULDING MACHINES

This application is a continuation-in-part of application serial number 07/122,205 filed Nov. 18, 1987, abandoned.

BACKGROUND OF THE INVENTION

The invention relates to a method for processing granulate and/or pulverulent polymer with pulverulent additives in an injection moulding machine and a screw for an injection moulding machine.

SUMMARY OF THE INVENTION

Injection moulding machines for processing thermoplasts are usually equipped with single screws. In injection moulding machines in a cylinder provided for the screws heating means are installed which together with the screw serve to heat, soften, melt and homogenise the polymer material on feeding the softened or melted polymer or conveying the softened polymer composition into an injection mould connected to a movable injection moulding member. With thermoplastic polymers, for example polyethylene, polypropylene, polystyrene, polyamides, saturated polyesters, ABS, SAN, fluorinated polymers, polycarbonate, acetal resins, etc., polymer granulate is usually the starting material. The processing of pulverulent thermoplasts is little used in injection moulding methods, an example of such a use being for hard PVC.

The aim of the invention is the direct processing of granulate and/or pulverulent polymer with pulverulent additives to plastic parts with excellent additive dispersion. These additives include materials such as mineral fillers (calcium carbonate, talc, glass beads, mica, wollastonite, dolomite, kaolin, feldspars, silicates, natural and synthetic silica, gypsum), metal oxides, metal powders, pigments (titanium dioxide, inorganic and organic pigments, etc.), flame retardants (aluminum trihydrate, magnesium hydroxide, magnesium carbonate, arsenic trioxide, etc.) hollow or filled glass balls, chemically or physically expanding or gas-developing agents, glass fibers up to a length of 10 mm, anti-oxidants and heat stabilizers, lubricants, anorganic flame protection agents such as $Al(OH)_3$ or $Mg(OH)_2$ etc., organic flame protection agents (e.g. hologenized products of powder type), maleic acid anhydride plus peroxide (plugging), pigments, india rubber and impact toughness modifiers, other ploymers for polyblends (alloys), slip and antiblocking additives, nucleating agents, fungicides, coupling and linking agents, and similar inorganic and organic solid products which are insoluble in the polymer melt in the injection moulding operation. Hitherto, such additives first had to be brought into a redispersible granulate form by an expensive and involved compounding or master batch preparation method prior to the injection moulding use. It is usual to homogeneously knead together the additives with a polymer or wax matrix with filling degrees up to 75% by weight (e.g. 75% by weight filler and 25% by weight carrier polymer) in internal mixers (Banbury type), twin-screw extruders with kneading elements (e.g. type ZSK of the company Werner & Pfleiderer, Stuttgart) or special kneaders (e.g. Ko-Kneter of Buss AG, CH-4133 Pratteln). Thereafter the filled melt is granulated by a granulating operation.

Since it was hitherto possible to process satisfactorily the aforementioned additives with the thermoplast granulates in injection moulding machines only in compounded form or as master batch, the intermediate step of compounding the additives, expensive as regards capital investment and energy consumption, or the usually somewhat cheaper master batch preparation with high filling grade, increase the volume price of the most important mass polymers such as LDPE, HDPE, LLDPE, PP or polystyrene with the addition of mineral fillers, which are the most important as regards quantities, such as calcium carbonate, talc and mica. Since injection mouldings always represent volumes, it is the volume prices and not the weight prices of pure polymer with the filler compounds or master batches which are to be compared. Consequently, mineral fillers in the aforementioned mass polymers according to the prior art cannot result in any reduction of the volume price if it is not possible to process them directly without previous compounding.

In the prior art, no publications are known which deal with the direct working or mixing in of the aforementioned pulverulent additives. DE-PS 2,708,200 discloses static mixers which are installed following the injection moulding screw, i.e. between the screw tip and injection mould, and serve primarily for temperature and colour homogenisation of the polymer melt; they cannot however disperse any solid additives.

DE-PS 2,838,516 discloses a mixing mandrel between the screw tip and injection mould which is disposed completely in the injection moulding nozzle and serves to homogenise the coour of the melt. DE-PS 858,310 describes a similar mixing mandrel. A backflow valve with mixer function is disclosed in G. Menges, W. Elbe: Plastverarbeiter 24 (1972) p. 137. In the known solutions, auxiliary means are always employed for other purposes without any modification being made to the screw of the injection moulding machine.

U.S. Pat. Nos. 4,285,600 and 4,363,768 describe generally a multichannel screw with various channel depths for improving the temperature constancy of the melt and for improving the dispersing of additives.

It is further known from DE-OS 2,840,478 to process materials with different melt temperature in an injection moulding machine without preparation in a compounding operation by changing the screw geometry; in kneading and mixing zones the spiral screw channel with constant screw core diameter is replaced by longitudinal channels which extend substantially in the axial direction of the screw and which are connected together by annular channels. With the methods disclosed in the aforementioned publications a disadvantage is that they work by the principle of increasingly better rolling out of increasingly thinner layers of the polymer melt in order to deagglomerate and disperse additives in the melt and this is however unsatisfactory as regards an adequate degree of dispersion and economical execution of the method. Also disadvantageous in the known solutions is that hitherto known screw modifications intended to be used for the aforementioned purpose always require construction of an injection moulding machine correspondingly adapted as regards the screw cylinder length.

It is further emphasized that the invention concerns a screw for an injection moulding machine which screw is provided for the typical injection mold procedure and always moves to and fro within the cylinder. During the back motion, new raw material (polymer granulate) is filled in through a funnel and is melted. The disperging of the fillers within the polymer melt is carried out only when the screw is moved back. During this time the mold with the injected fluid polymer material is closed. The polymer then solidifies, and the mold is opened and the finished part can be removed. Thereafter, the mold closes again. The injection mold screw, together with the accumulated melt mass at the front portion of the screw moves again towards the closed mold and fills it completely by injecting fluid polymer.

The injection mold form itself is not moveable. One half of the form is firmly mounted against the screw, whereas the second half can be opened for removing the finished product.

Screws are known in the prior art in various extrusion processes. However, these screws cannot be used interchangeable in an injection moulding process. Nor are they equivalent to screws which are utilized in an injection moulding process because the building up of a pressure is totally different. Furthermore, as noted above, the injection mold screw moves to and fro during one cycle. Contrary to this, the extrusion screw is stationary.

The problem underlying the invention is to provide a method and a screw of the type mentioned at the beginning with which granulate and/or pulverulent polymer can be processed particularly economically with pulverulent additives to give higher quality injection mouldings.

The steps according to the invention utilize in advantageous manner the effect that in a special flow operation the additive agglomerates contained undispersed in the melt due to their relatively large mass can be more highly accelerated than the polymer matrix melt itself. The additive agglomerates break up due to influences such as the accelerating force, impinging on the screw cylinder wall, impinging on the screw and the mixer element surface, impinging on other agglomerates and being accelerated again by a further mixer element arrangement. The pulverulent additives can be dispersed directly in the polymer melt without any necessary preceding compounding or master batch measures. This is economically favourable not only as regards the lower processing costs but also because the direct process can be carried out in an existing injection moulding machine without major conversion expenditure after replacing the conventional screw by the screw according to the invention.

The structure of the mixer element groups consisting preferably of annular segment portions, the number of the annular segment portions and the distance of the mixing element arrays from an introduction tube piece open towards the feed zone of the screw, the difference between the outer diameters of the mixer elements and the diameter of the screw core are advantageously adapted to the particular conditions desired such as polymer type, additive type, additive concentration, throughput magnitude, diameter of the screw, length of the screw and the maximum power of the screw drive.

The length of the screw according to the invention is at least 19 times, preferably 20 times, the screw diameter, the minimum circumferential speed of the screw preferably being 150 mm/sec., the dispersing of the additives improving with increasing circumferential speed because the acceleration of the melt filled with additive agglomerate at the edges of the annular ring portions takes place in the direction of rotation of the screw. For adequate dispersion it has been found favourable for the screw diameter to be at least 30 mm.

It was found by tests for example that it was possible with a screw according to the invention having a diameter of 70 mm and a length of 25D to process up to 40% pulverulent surface-coated calcium carbonate (Omyalite 90 T) with HUPE or PP granulate.

Further details, features and advantages of the invention will be apparent from the following description in which the invention is described in detail with reference to the attached drawings, diagrams and microscopic pictures and methods of testing the dispersion degree obtained are explained.

DETAILED DESCRIPTION OF THE PREFERRED EMBODIMENT

Figure 1:
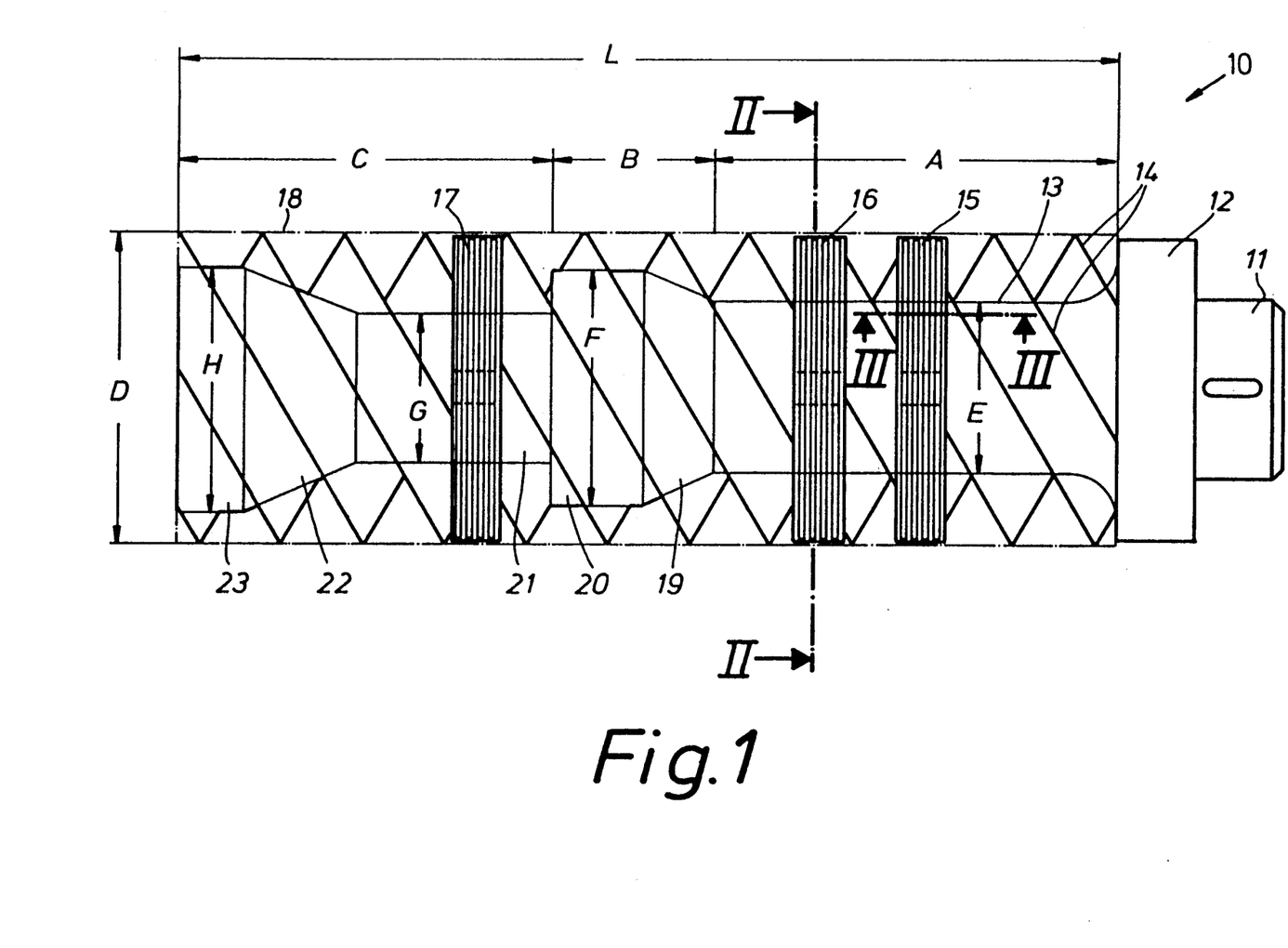
FIG. 1 is a schematic side view of an example of embodiment of a screw according to the invention.

FIG. 1 illustrates schematically an embodiment of a screw 10 according to the invention which has a drive shank 11 which merges into a screw flange 12. The screw flange 12 is followed by the working zone of the screw 10 having a working length L and consisting of a feed zone A, an intermediate zone B and a discharge zone C. The screw 10 comprises a screw core 13 on which a spiral screw land 14 is integrally formed. The screw 10 further comprises two mixing element arrays 15 and 16 in the feed zone A and a mixing element array 17 in the discharge zone C. A screw tip provided at the end of the screw 10 opposite the drive shank 11 and an injection moulding have been omitted in order to simplify the drawing, as have the usual drive means for the screw.

In FIG. 1 in dashed line a screw cylinder 18 of an injection moulding machine, which is not illustrated, is indicated in which the screw 10 rotates. The screw 10 has a diameter D. Its working length L is 20 D. The screw core 13 has in the feed zone A up to a region near the screw flange 12 a constant diameter E. The length of the feed zone A is 11 times the screw diameter D.

The mixing element arrays 15, 16 and 17 each have a width corresponding to twice the diameter D of the screw 10. The distance between the mixing element arrays 15 and 16 corresponds to the magnitude of the screw diameter D. The mixing element array 16 is arranged a distance equal to 10.5 times the screw diameter D from the left-side end of the screw 10 illustrated in FIG. 1. The corresponding distance of the mixing element array 15 is 13.5 times the screw diameter D.

The intermediate zone B has a length corresponding to 3 times the screw diameter D. The diameter E of the core 13 increases in a compression section 19 up to a diameter F which defines a metering section 20. The diameter F is about ⅛ greater than the diameter E.

At the start of the discharge zone C the core 13 has in a decompression section 21 a diameter G which is smaller than the diameter E. The length of the region with screw core diameter G extends over a length of approximately 4 times the screw diameter D. The mixing element array 17 is disposed in this decompression section 21 at a distance from the intermediate zone B corresponding to the screw diameter D. The distance of the mixing element array 17 from the end of the screw 10 illustrated opposite the drive shank 11 corresponds to 3 times the screw diameter D. In this interval there is part of the decompression section 21, a further compression section 22 and a further metering section 23 having a diameter H which is greater than the diameter F of the metering section 20.

The various zones A, B and C can be defined as follows:

Discharge Zone C
 The melt enters this zone in a compressed homogenized form and is degasified in the decompression section 21, thereafter finally dispersed in the mixing array 17 and finally prepared for injection conditions without air over the further compression section 22 and further metering section 23.

Feed Zone A
 This zone is for initially introducing granulate and/or pulverulent polymer and pulverulent additives, respectively, and for mixing thereof to attain predispersion of additives. At the end of the feed zone, the introduced granulate and/or polymer and additives exist in independent form and are not completely disintegrated. During transport through the feed zone, warming up of the introduced material takes place, as usual.

Intermediate Zone B
 In the intermediate zone, disintegration of the heated polymer and the additives is performed by compression, and the metering section is for homogenizing and transporting the melt.

Figure 2:
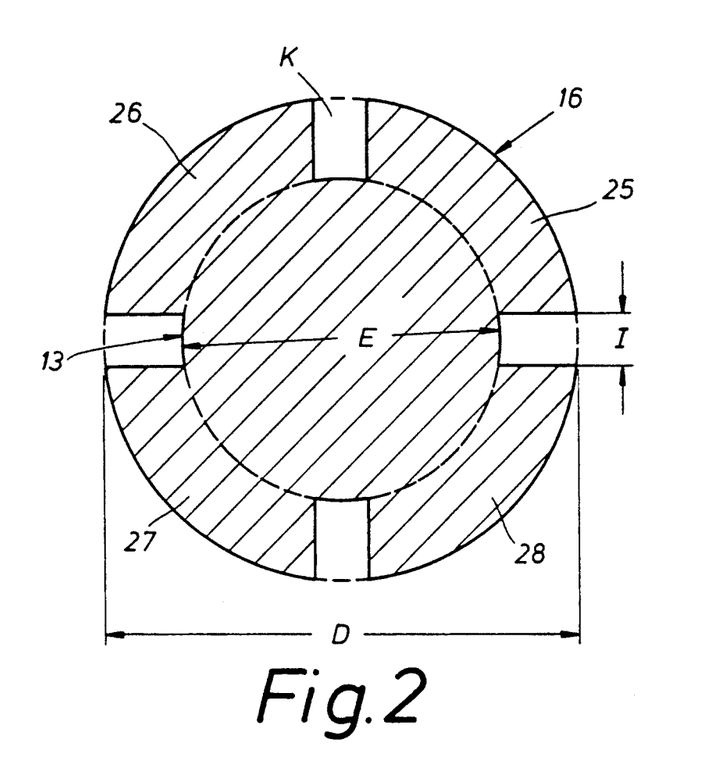
FIG. 2 is a section along the line II—II of FIG. 1.
Figure 3:
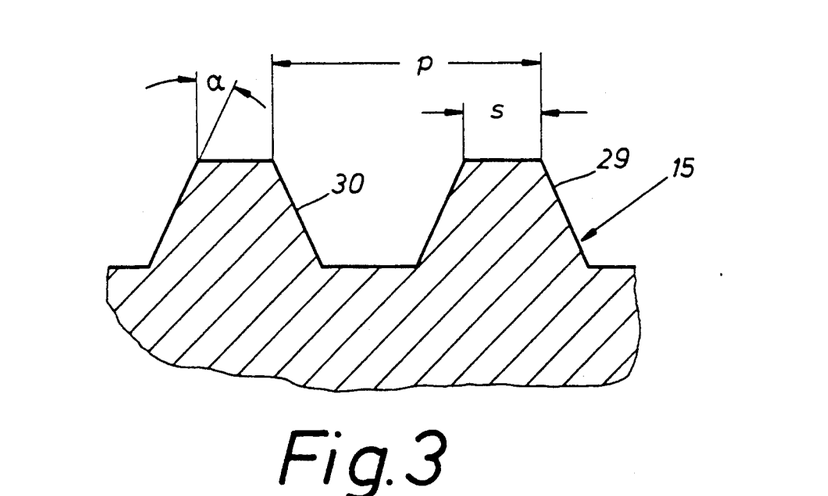
FIG. 3 is a partial section along the line III—III of FIG. 1.

FIG. 2 shows a section through the mixing element array 16. The mixing element array 16 is made up of four annular segment portions 25–28 which are integrally formed on the screw core 13. The annular segment portions are arranged in a total of five groups parallel to each other perpendicular to the longitudinal axis of the screw but in an alternative arrangement may be arranged in spiral form. The lateral spacing of adjacent anular segment portions correspond approximately to the thickness of the annular segment portions. The annular segments 25–28 forming a group of the mixing element array 16 are arranged on the core 13 of the screw 10 in such a manner that between two adjacent annular segment portions there is a constant spacing I. The passage area resulting from said spacing is designated in FIG. 2 by the letter K. FIG. 3 shows a partial section through two groups of the mixing element array 15. Apparent therein is the symmetrical profile makeup of the annular segment portions 29 and 30 which are arranged spaced apart in the longitudinal direction of the screw 10. The profile of the annular segment portions 29, 30 has a trapezoidal form with an acute angle which is about 15°. The width of each annular segment portion 19 or 30 in the region of the engagement with the screw cylinder 18 is designated by s and is for example 2 mm. The distance b between the annular segment portions 29 and 30 is for example 10 mm.

The sum of the passage areas K in an array of a mixing element arrangement is so dimensioned that it is greater than the cross-sectional area extending perpendicularly between two adjacent screw lands 14 and available for throughput of the mixture. The sum of the areas K is preferably up to a factor of 1.5 greater than the latter area. This makes it possible to establish flow conditions in the region of the mixing element arrays which give a particularly effective dispersing.

After introduction of polymer granulate and pulverulent additives into the feed zone A the melt filled with the additive agglomerates is accelerated by the edges of the annular segment portions, which laterally define the passage area K, in the direction of rotation of the screw. With increasing circumferential speed of the annular segment portion edges the dispersion of the additives is of course improved, i.e. the method only provides adequate dispersion from screw diameters D of 30 mm upwards The maximum number of annular segment portions per group of a mixing element array is governed by the strength properties in the transition to the screw core. For example, with a screw of 30 mm diameter and an annular segment thickness of 5 mm the base diameter of the annular segments must be at least 4 mm to be able to take up the forces occurring. The height of the annular segment portions or the remaining diameter of the screw core is governed by the desired delivery action of the screw. The thickness of the annular segment portions depends on the forces which occur. It is for example 4–5 mm with a screw diameter D of 30 mm and 10 mm with a screw diameter of D=70 mm.

It has been found advantageous in practice, giving the best additive dispersion depending on the diameter of the screw, for at least 15 annular segment groups to be arranged in three mixing element arrays 15, 16 and 17 on the injection moulding screw 10. The minimum circumferential speed of the screw is 155 mm/s.

The additive dispersion in the polymer can be checked by the following three methods:

A. Examination with raster electron microscope (REM)

Samples of 5 mm length were cut from the injection mouldings, embedded in synthetic resin and after curing ground with silicon carbide gradations 120, 220, 400, 600 and 1000 at 300 rpm Polishing then follows with diamond 6μm. 3μm and 1 μm on a hard cloth with Struers blue (alcohol plus mineral oil) lubricant. After bombarding the surface by means of argon ions (pressure 3 mb, current 50 mA, 1200 V for 6 min.) the surface is covered with gold. The REM pictures are made with back-scatter electrons of 20 kev.

B. Examination with an optical microscope with image analyzer

The sample is made as in A. up to and including the polishing with diamond. In reflection light the filler particles (e.g. calcium carbonate) differ in the grey tone from the polymer matrix (e.g. HDPE). With an image analyzer (Optomax IV Image Analyzer of Micromeasurements Ltd., GB-Leeds) and with a special computer program the magnitude of the additive agglomerates can be obtained in direct printout in volume %.

C. Examination by means of extrusion through a screen pack

Manufacturers of pigments (e.g. titanium dioxide) or filler concentrates test the dispersion degree obtained in the end product by means of extrusion through a screen pack with defined mesh widths (K. Wolny: Dispersion of titanium dioxide pigments in plastics in "Kunststoffe" 70 (1980) 6, p. 352). Either the amount of extrudable concentrate until a predetermined mass pressure is reached in front of the screen pack is measured (buildup of non-dispersed pigment agglomerates on the screen pack) or the amount retained on the screen is determined after extrusion of a predetermined amount of pigment concentrate The less this screen residue is the better the pigment or filler dispersion in the concentrate.

The method of the amount retained on the screen or the residue on a screen pack of 4 screens with mesh widths in the flow direction of the polymer melt of 400 $\mu$m, 100 $\mu$m, 25 $\mu$m and 10 $\mu$m, used in a screen pack changer of the company Falzoni, I-44012 Bondeno, was used as further technique for checking the degree of dispersion obtainable with the new screw. The filled parts made with a conventional mixing screw, a standard injection moulding screw and the injection moulding screw according to the invention were granulated and extruded through said screen pack by means of a laboratory extrusion meter (Göttfert Werkstoff-Prüf-maschinen GmbH, D-6967 Buchen)

The test conditions were
thread depth ratio of the extrusion screw :1:2
speed of the extrusion screw :75 rpm
flat nozzle :2 mm 2 mm x 10 mm×10 mm
material temperature in front of the screen pack for HDPE : 200° C.
material temperature in front of the screen pack for PP :230° C.
additive amount :1000 g The screen pack was first weighed, installed in the laboratory extruder and flushed with pure polymer melt Thereafter, a predetermined amount of the granulated filled injection mouldings containing a total of 1000 g additive is extruded through the screen pack and after roasting (2 h at 600° C.) the residue of additives filtered from the melt on the screen pack is determined.

In the following examples 1-4 using at least some of the aforementioned examination methods additive dispersions after the injection moulding were investigated which had been obtained by known methods

EXAMPLE 1

Processing of pulverulent calcium carbonate filler with HDPE granulate by means of a conventional mixing screw Calcium carbonate filler ($CaCO_3$) with a mean statistical particle diameter of 3.0 $\mu$m (Millicarb) of Pluss-Staufer AG, CH-4665 Oftringen with a filling degree of 20% by weight HDPE was premixed with 80% by weight Hostalen GC 7260 granulate (Hoechst AG) in a tumbling mixer for 30 min and worked in a conventional injection moulding machine. This machine was a Netstal 300 RE of the company Netstal-Maschinenfabrik AG in CH-8754 Netstal A mixing screw was used with a diameter D of 45 mm and a total length of 25 D=1125 mm. The screw had a feed zone of length 20 D with a single-flight screw channel and a constant 2 mm channel or thread depth, an adjoining intermediate zone in the form of a so-called Maddock section of length 2.5 D for shearing of undisintegrated mixture components and a discharge zone having a mixing element arrangement of length 2.5 D which consisted of obliquely offset cams as dispersing aids. This mixing screw is for example described in the journal Plastverarbeiter (23) 1972/10, p. 679.

The injection moulding tests were carried out with a screw speed of 200 rpm, a specific injection pressure of 1626 bar and a cylinder temperature of 200° C.

The injection mouldings made showed that a commercially usual mixing screw is not suitable for direct dispersion of additives such as fillers. The injection mouldings contained filler agglomerates with diameters up to several millimeters. The surface of the finished parts exhibited pronounced streaks.

The filtering test described under C using a screen pack resulted according to Table 1, No. 1, even on extrusion of a corresponding amount of filler of 265 g (corresponding to only 26.5% of the amount of filler of 1000 g otherwise used for the test) in such a high pressure increase (210 bar) in front of the screen pack that the test had to be broken off. The residue on the screen pack after roasting was 8670 mg.

EXAMPLE 2

Processing of CaCO, with HDPE master batch by means of a standard injection moulding screw Mineral fillers such as calcium carbonate or talc and pigments ($TiO_2$, carbon black) in accordance with the prior art must first be dispersed and granulated by a compounding or master batch method in corresponding polymers or waxes so that they can be worked into the thermoplasts besides PVC in the injection moulding method. (It will be shown below that with the screw according to the invention a similar filler or additive dispersion is possible with direct pulverulent addition avoiding the previous master batch or compound preparation.)

To illustrate the prior art a commercially available master batch granulate type Multibase HDPE 707 A of the company Multibase SA in F-38380 Saint-Laurent-du-Pont was used consisting of 70% by weight of a calcium carbonate with a mean statistical particle diameter of 3.0 $\mu$m (Millicarb) and 30% by weight HDPE. The melt index of the HDPE used was 7 (190° C., 2 kg). The master batch was diluted prior to introduction into the hopper of the injection moulding machine with pure HDPE Hostalen GC 7260 granulate of Hoechst AG to a calcium carbonate concentration of 20% by weight. The machine conL ditions chosen were those set forth in Example 1. As screw a standard screw usual for processing polyolefins was used, Art. No. 117.822.4586 having a diameter of 70 mm and a length to diameter ratio L/D of 25, obtained from the NetstalMaschinenfabrik.

Figure 4:
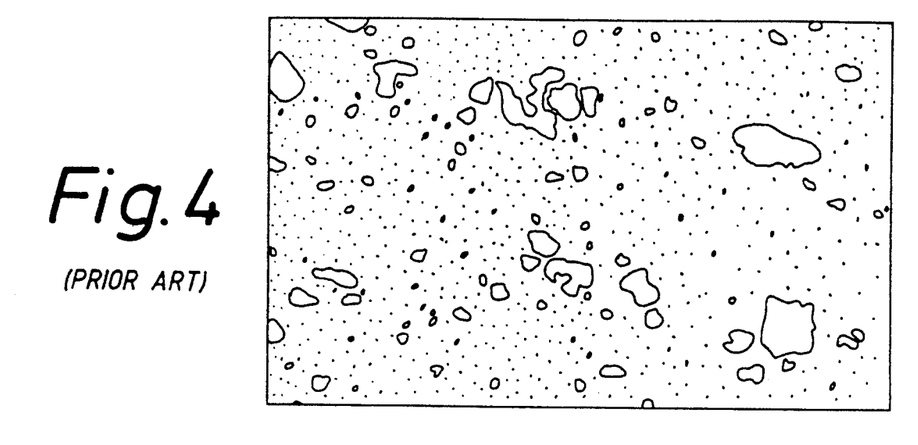
FIG. 4 is a raster electron microscope picture of a sample cut from injection-moulded test bodies with a magnification of 1600 times made from the mixture of a commercially available calcium carbonate/HDPE master batch granulate with pure HDPE granulate using a conventional injection moulding screw.

FIG. 4 shows REM pictures of specimens cut from injectionmoulded test bodies with a magnification of 1600×. The method described under A. was employed In the filler master batch clear agglomerates can be seen FIG. 5 shows the picture described under B with the optical microscope from the same injection moulding depths as FIG. 4.

Figure 5:
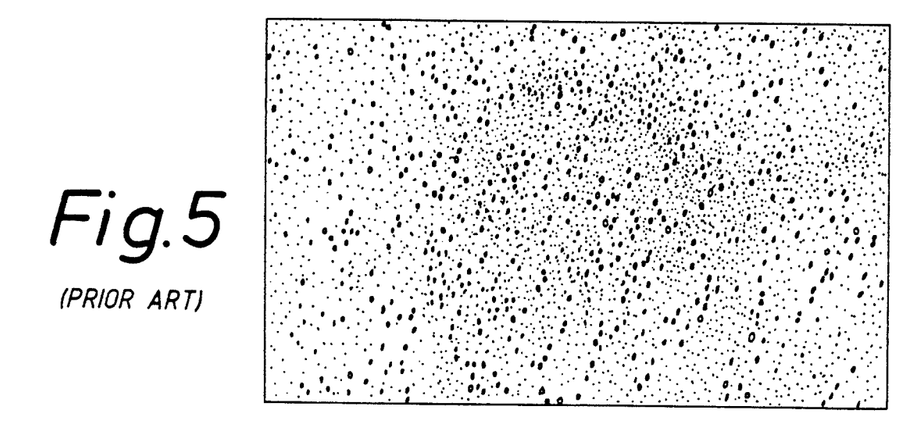
FIG. 5 is an optical microscope picture of injection moulded test bodies from the same injection-moulded depths and the same materials and methods as in FIG. 4.
Figure 6:
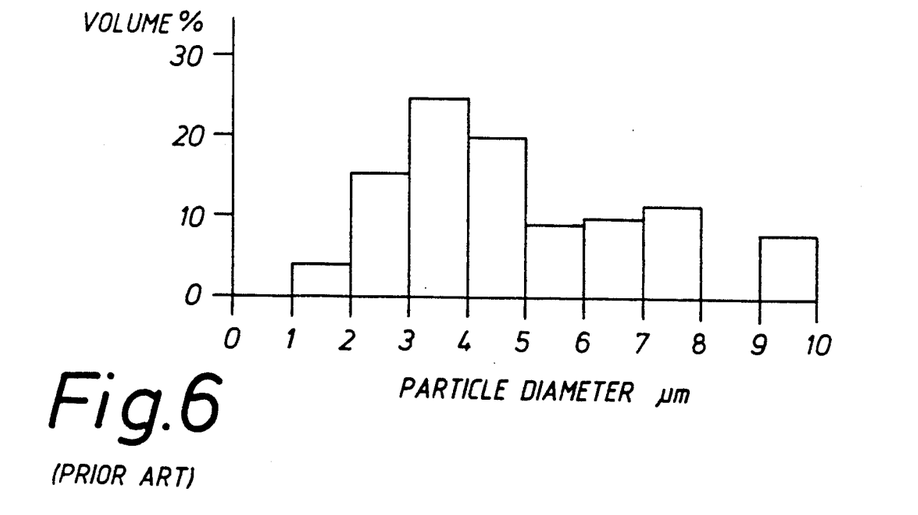
FIG. 6 is a histogram made by the image analyzer of the optical microscope picture shown in FIG. 5 to represent the volume proportion of the filler particles or filler agglomerates as a function of the particle or agglomerate diameter.

FIG. 6 shows the histogram of FIG. 5 evaluated over an area of 10000 $\mu m^2$ by the image analyzer, i e. the volume proportion of the filler particles or filler agglomerates as a function of the particle or agglomerate diameter. The coarsest particles have a diameter of 10$\mu$m.

In the filtering test described under C through the screen pack the injection-moulded parts according to Table 1, No. 2, gave a maximum screen residue after roasting of 147 mg from 1000 g Millicarb extruded through the screen pack.

EXAMPLE 3

Processing of talc with PP compound by means of a standard injection moulding screw Commercially available compound Hostalen PPN 7190 TV 40 with a filling degree of 40% by weight talc of Hoechst AG D-Frankfurt-Hoechst was chosen. The machine and screw were the same as in Example 2. The injection moulding conditions were the same as those in Example 2. Example 3 shows in Table 1 the roasting residue and the filtering test with the injection-moulded test bodies.

EXAMPLE 4

Processing of $TiO_2$ master batch with PE granulate by means of a standard injection moulding screw As typical representative of pigment master batches Remafin AEX 77 of the company Novacrome, I-22050 Lomagna, was chosen and comprised 63% by weight $TiO_2$ and 37% by weight poiyethylene matrix The filtering test through the screen pack (without previous injection moulding) showed in accordance wtih Table 1, No. 4 a very good pigment dispersion with a roasting residue on he screen pack of only 45 mg.

TABLE 1

| | Screen residue according to the prior art | | |
|---|---|---|---|
| No. | Method/Remarks | Additive amount | Roasting residue |
| 1 | 1. Direct mixing of 20% by weight $CaCO_3$ with 80% by weight HDPE granulate Test broken off after pressure rise in front of the screen pack to over 210 bar 2. State of the compounding and master batch technique | 265 g | 8670 mg |
| 2 | (a) Master batch comprising 70% by weight $CaCO_3$/30% by weight HDPE diluted with HDPE to a filling degree of 20% by weight $CaCO_3$ Pressure rise in front of the screen pack max. 35 bar | 1000 g | 147 mg |

TABLE 1-continued

| | Screen residue according to the prior art | | |
|---|---|---|---|
| No. | Method/Remarks | Additive amount | Roasting residue |
| 3 | (b) Compound of 40% by weight talc/60% by weight PP Pressure rise at the screen pack max. 42 bar | 1000 g | 576 mg |
| 4 | (c) White pigment master batch comprising 63% by weight $TiO_2$/37% by weight PE Pressure rise in front of the screen pack max. 35 bar | 1000 g | 45 mg |

In the following Examples 5 to 15 using the test methods A - C explained above additive dispersions achieved with the method according to the invention or the screw according to the invention in polymers after the injection moulding were investigated.

EXAMPLE 5 Processing of $CaCO_3$ filler in HDPE granulate

Figure 7:
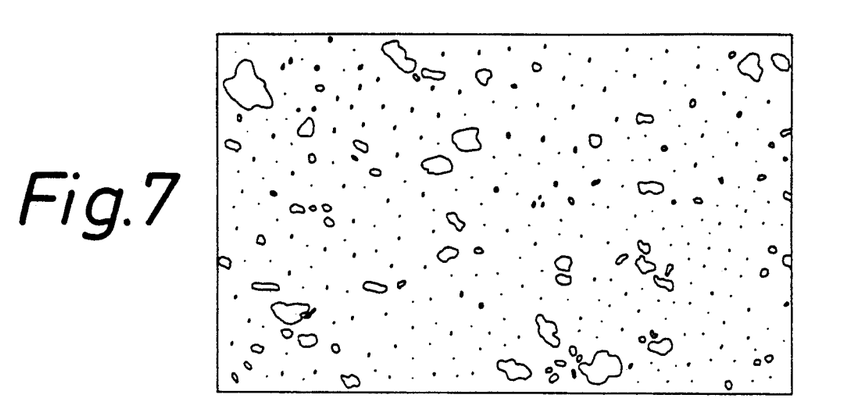
FIG. 7 is a raster electron microscope picture corresponding to FIG. 4 but obtained by mixing the pulverulent additive with HDPE granulate using a screw constructed according to the invention.

The system (20% Millicarb/80% HDPE) described in Example 1 was chosen with the difference that instead of the standard mixing screw the mixing screw 1 according to the present patent application was used. The injection moulding conditions were chosen corresponding to Example 1. The filler powder and polymer granulate were metered directly into the hopper of the injection moulding machine FIG. 7 shows an REM picture of a specimen cut from an injectionmoulded test body with a magnification of 1000 x. The method described under A. was used A comparison with FIG. 4 shows that with the mixing screw of the present patent application with disc-shaped slit mixers the additive dispersion obtained is at least just as good as that obtained with preceding master batch treatment (Example 2).

Figure 8:
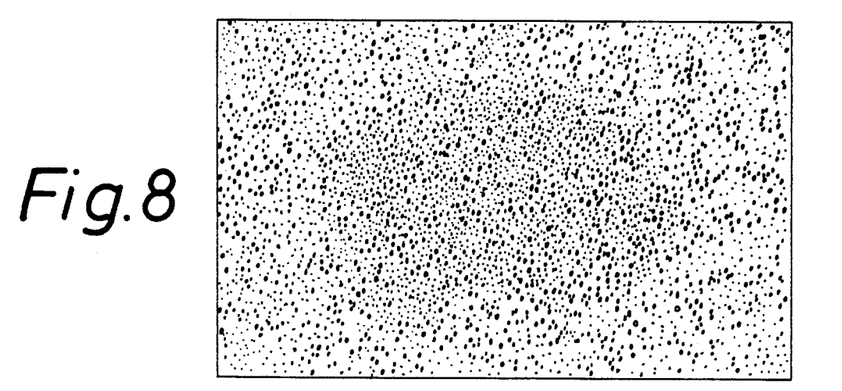
FIG. 8 is an optical microscope picture corresponding to FIG. 5 but for a corresponding injection moulding by mixing the pulverulent additive with HDPE granulate using a screw constructed according to the invention.
Figure 9:
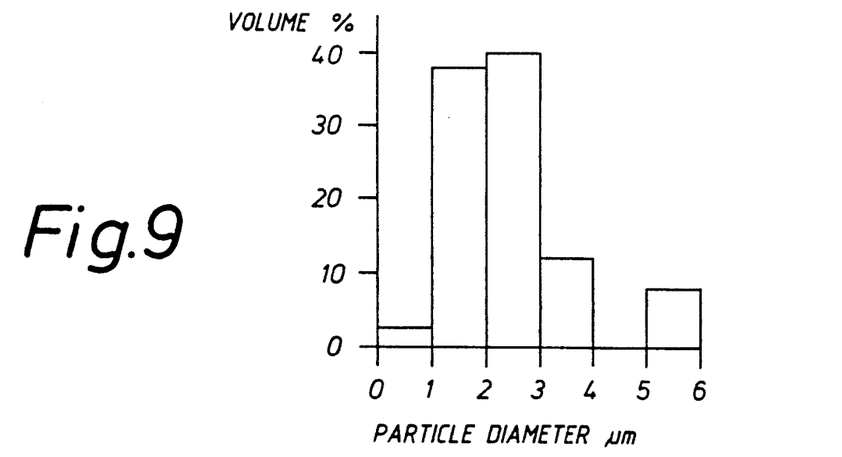
FIG. 9 is an illustration corresponding to FIG. 6 but for a corresponding injection moulding obtained by mixing the pulverulent additive with HDPE granulate using a screw constructed according to the invention.

FIG. 8 shows the microscopic picture described in method B on the same injection moulding depths A comparison with FIG. 5 (injection moulding of the same filler in the form of a master batch) shows the comparably good dispersion effect of the mixing screw with direct pulverulent addition of the filler to the HDPE granulate FIG. 9 shows the histogram corresponding to FIG. 8 of the volume proportions of the filler granulates in the injection moulding. A comparison of the histograms of FIG. 9 and FIG. 6 shows that the coarsest agglomerates with the mixing screw are 6 $\mu$m but with the master batch method are up to 10 $\mu$m diameter.

Test No. 5, Table 2, further shows that with the method of the screen packs as well an additive dispersion of quaity comparable to the master batch made by the prior art (No. 2) is found.

EXAMPLE 6

Processing of $CaCO_3$ filler in HDPE granulate

In this example with otherwise the same conditions as in Example 5 the Millicarb filler was increased to 30% by weight with 70% by weight HDPE granulate. No. 6 in Table 2 shows with the roasting residue that even when the degree of filling is increased by 50% (20% by weight to 30% by weight) no appreciably greater filler agglomerate formation takes place.

EXAMPLE 7 Processing of CaCO$_3$ filler in HDPE granulate

In test No. 7 a finer calcium carbonate (mean particle diameter 1.5 μm) of type Omyalite 90 T of Pluss-Staufer AG surface-treated with stearic acid was chosen under otherwise the same conditions as in Example 6. Experience gathered in the polymer art with mineral fillers has shown that especially in nonpolar polymers such as polyolefins a better dispersion is achieved by the surface coating of the fillers. This is also apparent in Table 2, test 7, where with the fine surface-coated CaCO, an improved dispersion (less roasting residue) is obtained with the coarser uncoated calcium carbonate (Millicarb).

EXAMPLE 8

Processing of calcium carbonate filler in polypropylene granulate

As mixing screw the screw illustrated as mixing screw 2 is used, having a diameter of 70 mm, an L/D ratio of 25, operating under the machine conditions described in Example 1.

The Millicarb filler was 20% by weight. As polypropylene 80% by weight Propathene GYM 45 of ICI, GB-Welwyn Garden City, was used with a melt index of 14 to 15 (230° C./2 kg). This is a homopolypropylene granulate. Test No. 8 in Table 2 shows that with a roasting residue of only 95 mg excellent filler dispersion is obtained.

EXAMPLE 9

Processing of calcium carbonate filer in polypropylene granulate

Under the conditions set forth in Example 8 the Millicarb degree of filling was raised to 30% by weight. The dispersion measured via the screen residue in No. 9 is somewhat poorer than with a lower degree of filling but as regards the quality of the surface of the finished part must still be considered good.

EXAMPLE 10

Processing of calcium carbonate filler in polysytrene and ABS

30% by weight Millicarb is directly dispersed in 70% by weight Hostyren N 2000 granulate of Hoechst AG with mixing screw 2 and the conditions of Example 8. The roasting residue according to No. 10 shows that the redispersion of the carbonate in polystyrene is at least as good as in HDPE.

EXAMPLE 11

Processing of calcium carbonate filler in polystyrene and ABS

20% by weight Omyalite 90 T was dispersed as in Example 10 directly with the mixing screw 10 in 80% by weight ABS granulate (Lustran 240 of Monsanto, I-Milan). In this polymer as well good distribution is also achieved as shown by the roasting residue

EXAMPLE 12

Processing of talc filler in polypropylene granulte

Instead of the calcium carbonate described in Example 8 in this case under otherwise the same conditions 20% by weight ground talc type OOS with a mean statistic particle diameter of 10 μm from the company Talc de Luzenac, F 9250 Luzenacsur Ariege was used. Test No. 12 shows good redispersion similar to that in test No. 3 according to the present state of the art (pre-compounding of the talc with PP).

EXAMPLE 13

Processing of talc filler in polypropylene granulate

Under the same conditions as in Example 12 the talc degree of filling was increased to 40% by weight. With this as well a good filler dispersion (filtering test No. 13) was achieved with the mixing screw 2.

EXAMPLE 14

Processing of colour pigments in polyolefin granulate

In this case 5% by weight TiO$_2$ (Tiona 472 of SMC Chemicals Ltd., GB-Grimsby) was dispersed directly in 95% by weight HDPE Hostalen GC 7260 granulate under the conditions given in Example 5. This pigment concentration corresponds approximately to the maximum pigment amount used in polyolefin injection moulding. The roasting residue according to No. 14 shows excellent additive dispersion when compared with the roasting residue No. 4 of the prior art (TiO$_2$ master batch).

EXAMPLE 15

Processing of flame retardant in polyolefin granulate

As typical flame retardant 30% by weight aluminium tri hydrate (Al(OH)$_3$), Martinal OL 104 of Martinswerk GmbH, D-5010 Bergheim, was used It was admixed directly with 70% by weight HDPE according to Example 6 but the injection moulding was carried out at 200° C. screw cylinder temperature (Al(OH)$_3$ decomposes above 200° C.). The roasting residue of test 13 shows excellent dispersion for typical flame retardants as well.

TABLE 2

| No. | Method/Remarks | Additive amount | Roasting residue |
|---|---|---|---|
| 1. | Mixing screw with calcium carbonate in HDPE | | |
| 5 | 20% b.w. Millicarb/80% b.w. HDPE | 1000 g | 132 mg |
| 6 | 30% b.w. Millicarb/70% b.w. HDPE | 1000 g | 166 mg |
| 7 | 30% b.w. Omyalite 90T/70% b.w. HDPE | 1000 g | 107 mg |
| 2. | Mixing screw with calcium carbonate in PP | | |
| 8 | 20% b.w. Millicarb/80% b.w. homo-PP | 1000 g | 95 mg |
| 9 | 30% b.w. Millicarb/70% b.w. homo-PP | 1000 g | 240 mg |
| 3. | Mixing screw with calcium carbonate in polystyrene and ABS | | |
| 10 | 30% b.w. Millicarb/70% b.w. polystyrene | 1000 g | 107 mg |
| 11 | 20% b.w. Omyalite 90%/80% b.w. ABS | 1000 g | 184 mg |
| 4. | Other fillers | | |
| 12 | 20% b.w. talc/80% b.w. PP | 1000 g | 642 mg |
| 13 | 40% b.w. talc/60% b.w. PP | 1000 g | 705 mg |
| 5. | Pigments | | |
| 14 | 5% b.w. TiO$_2$/95% b.w. HDPE | 1000 g | 15 mg |
| 6. | Flame retardant | | |
| 15 | 30% b.w. Al(OH)$_3$/70% | 1000 g | 237 mg |

TABLE 2-continued

| | | Screen residue with screw according to the invention with mixing components | |
|---|---|---|---|
| No. | Method/Remarks | Additive amount | Roasting residue |
| | b.w. HDPE | | |

We claim:

1. Screw for an injection moulding machine for processing polymer with pulverulent additives comprising a feed zone (A) having a constant screw core diameter (E), an intermediate zone (B) including a compression section and a metering section and a discharge zone (C) comprising at least one mixing element array (17), wherein the screw (10) has screw lands (14) and in its feed zone (A) comprises at least two mixing element arrays (15,16) and wherein each mixing element array (15,16,17) consists of spaced apart annular segment portions forming passage areas (K), the sum of passage areas in an array of a mixing element arrangement is so dimensioned that it is greater than the cross-sectional area extending perpendicularly between two adjacent screw lands (14).

2. Screw according to claim 1, wherein the annular segment portions have a symmetrical profile.

3. Screw according to claim 1, wherein the annular segment portions are arranged perpendicularly to the longitudinal axis of the screw (10) in parallel groups, the lateral spacing of annular segment portions disposed adjacent each other in the direction of the longitudinal axis corresponding approximately to the thickness of the annular segment portions.

4. Screw for an injection moulding machine for processing polymer with pulverulent additives, said screw having a screw core and at lest one spiral screw land on the screw core defining an outside diameter (D) of the screw and comprising a feed zone (A) having a constant screw core diameter (E), an intermediate zone (B) including a compression section and metering section and a discharge zone (C) following said metering section and comprising at least one mixing element array (17), wherein the screw (10) in its feed zone (A) comprises at least two mixing element arrays (15,16), and wherein said screw core diameter (G) at the start of the discharge zone (C) is first abruptly reduced from a larger diameter (F) in the metering section (20) of the intermediate zone (B) to a screw core diameter (G) which is less than the screw core diameter (E) in the feed zone (A) and remains constant over a section which includes the mixing element array (17) and the length of which corresponds approximately to 4 times the screw diameter (D) and that the reduced screw core diameter (G) thereafter widens to a second metering section (23) having a larger screw core diameter (H) than that of the metering section (20) of the intermediate zone (B).

5. Screw for an injection moulding machine for processing polymer with pulverulent additives comprising a feed zone (A) having a constant screw core diameter (E), an intermediate zone (B) including a compression section and a metering section and a discharge zone (C) comprising at least one mixing element array (17), wherein the screw (10) in its feed zone (A) comprises at least two mixing element arrays (15,16) and wherein the screw has a diameter and the distance of the downstream mixing element array (16) in the feed zone (A) from the compression section of the intermediate zone (B) corresponds approximately to 1.5 times the screw diameter (D).

6. Screw for an injection moulding machine for processing polymer with pulverulent additives comprising a feed zone (A) having a constant screw core diameter (E), an intermediate zone (B) including a compression section and a metering section and a discharge zone (C) comprising at least one mixing element array (17), wherein the screw (10) in its feed zone (A) comprises at least two mixing element arrays (15,16) and wherein the screw has a diameter and the distance of the mixing element array (17) arranged in the discharge zone from the end thereof corresponds approximately to three times the screw diameter (D).

* * * * *